(12) United States Patent
Yeh et al.

(10) Patent No.: US 8,321,358 B2
(45) Date of Patent: Nov. 27, 2012

(54) INTERPERSONAL RELATIONSHIPS ANALYSIS SYSTEM AND METHOD WHICH COMPUTES DISTANCES BETWEEN PEOPLE IN AN IMAGE

(75) Inventors: Chien-Fa Yeh, Taipei Hsien (TW);
Chung-I Lee, Taipei Hsien (TW);
Chiu-Hua Lu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 503 days.

(21) Appl. No.: 12/650,815

(22) Filed: Dec. 31, 2009

(65) Prior Publication Data
US 2011/0097694 A1 Apr. 28, 2011

(30) Foreign Application Priority Data
Oct. 26, 2009 (CN) .......................... 2009 1 0308804

(51) Int. Cl.
*G06F 15/18* (2006.01)
(52) U.S. Cl. ....................................................... 706/12
(58) Field of Classification Search .................... 706/12, 706/45, 62
See application file for complete search history.

(56) References Cited

U.S. PATENT DOCUMENTS

| 7,761,342 | B2 * | 7/2010 | Calabria ...................... 705/26.1 |
| 2008/0172407 | A1 * | 7/2008 | Sacks ............................ 707/102 |
| 2008/0270425 | A1 * | 10/2008 | Cotgreave ..................... 707/100 |
| 2009/0196510 | A1 * | 8/2009 | Gokturk et al. ................ 382/224 |
| 2010/0106573 | A1 * | 4/2010 | Gallagher et al. ............ 705/14.4 |
| 2010/0205179 | A1 * | 8/2010 | Carson et al. ................. 707/740 |
| 2012/0082389 | A1 * | 4/2012 | Sakamoto ..................... 382/224 |

OTHER PUBLICATIONS

Zak et al., Autotagging Facebook: Social Network Context Improves Photo Annotation, 2008, Harvard,pp. 1-8.*

* cited by examiner

Primary Examiner — David Vincent
(74) Attorney, Agent, or Firm — Altis Law Group, Inc.

(57) ABSTRACT

An interpersonal relationships analysis method and system obtains an album comprising a plurality of photos, and recognize faces in each of the plurality of photos. The method and system further selects one of the recognized faces, matches the selected face with portraits stored in a person management database, so as to obtain basic information of a person with the selected face from the person management database. The method and system then analyzes an interpersonal relationship of the person with the selected face according to the album, and shows the interpersonal relationship of the person with the selected face.

15 Claims, 6 Drawing Sheets

INTERPERSONAL RELATIONSHIPS ANALYSIS SYSTEM AND METHOD WHICH COMPUTES DISTANCES BETWEEN PEOPLE IN AN IMAGE

BACKGROUND

1. Technical Field

Embodiments of the present disclosure generally relate to systems and methods for analyzing information, and more particularly to a system and a method for analyzing interpersonal relationships.

2. Description of Related Art

An interpersonal relationship is an association between two or more people that may range from fleeting to enduring. This association may be based on friendliness, love, regular business interactions, or some other type of social commitment. Interpersonal relationships take place in a great variety of contexts, such as family, friends, marriage, associates, work, clubs, neighborhoods, and churches.

As is known, interpersonal relationships play a positive role in making a success of career. Thus, how to establish a wide interpersonal relationship is important for every person.

The proverbial "six degrees of separation" was first proposed in 1967 by sociologist Stanley Milgram. The "Six degrees of separation" refers to the idea that, if a person is one step away from each person they know and two steps away from each person who is known by one of the people they know, then everyone is at most six steps away from any other person on Earth.

According to the "six degrees of separation," every person can extend they interpersonal relationship by knowing each person who is known by one of the people they know. However, how to find persons who is known by one of the people they know, namely analyzing interpersonal relationships of the people they know is a burning question.

DETAILED DESCRIPTION

The disclosure is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
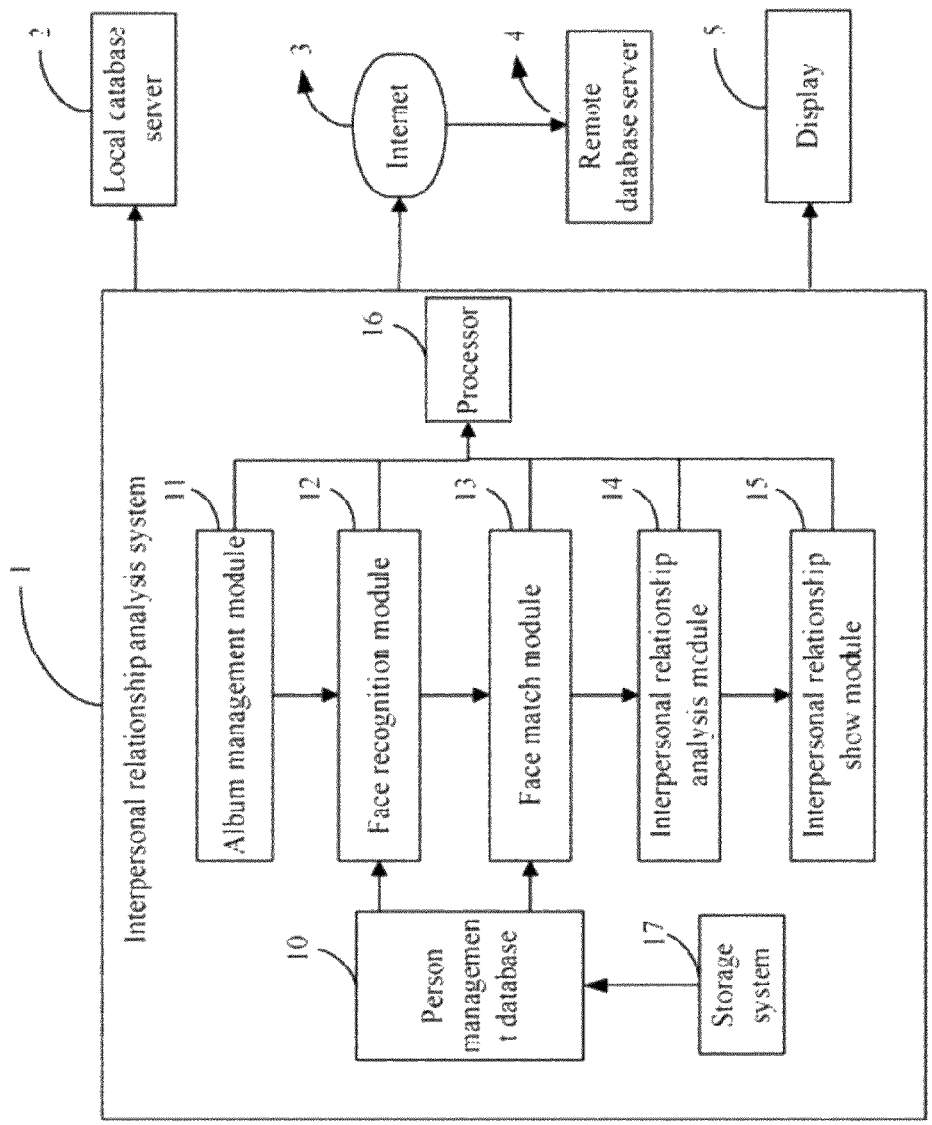
FIG. 1 is a block diagram of one embodiment of an interpersonal relationships analysis system including function modules.

FIG. 1 is a block diagram of one embodiment of an interpersonal relationships analysis system 1 including function modules. In the embodiment, the interpersonal relationships analysis system 1 includes a person management database 10, an album management module 11, a face recognition module 12, a face match module 13, an interpersonal relationship analysis module 14, and an interpersonal relationship show module 15. In one embodiment, the interpersonal relationships analysis system 1 further includes at least one processor 16 that executes one or more computerized codes of the modules 11-15. The one or more computerized codes of the functional modules 11-15 may be stored in a storage system 17 of the interpersonal relationship analysis system 1.

The person management database 10 stores a portrait and basic information of each given person. It may be understood that, the given persons are known by a user of the interpersonal relationships analysis system 1. In the embodiment, the basic information includes, but be not limited to, name information, address information, phone number information, for example.

The album management module 11 is operable to obtain an album comprising a plurality of photos from a remote database server 4 via the Internet 3 or from a local database server 2.

The face recognition module 12 is operable to recognize faces in each of the plurality of photos obtained by the album management module 11.

The face match module 13 is operable to select one of the recognized faces, match the selected face with the portraits stored in the person management database 10, so as to determine if basic information of a person with the selected face is stored in the person management database 10.

The interpersonal relationship analysis module 14 is operable to analyze an interpersonal relationship of the person with the selected face according to the album upon condition that the basic information of the person with the selected face is stored in the person management database 10. In detail, the interpersonal relationship analysis module 14 obtains the photos that comprises more than one faces including the selected face from the album and selects one of the obtained photos. Furthermore, the interpersonal relationship analysis module 14 computes a number "t" of persons comprised in the selected photo according to the recognized faces, and computes a distance "d" between the person with the selected face and each of the other persons comprised in the selected photo. In one embodiment, the distance is a relative value indicating how close two persons stand in the selected photo.

Figure 2:
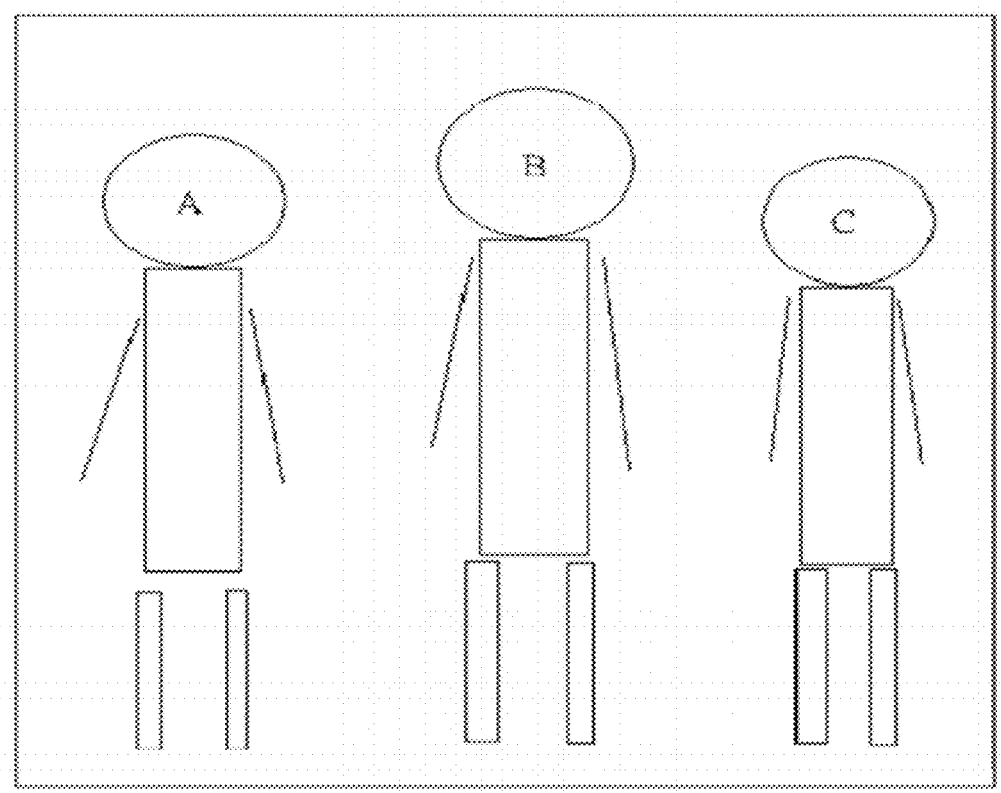
FIG. 2 shows an example of a photo.
Figure 3:
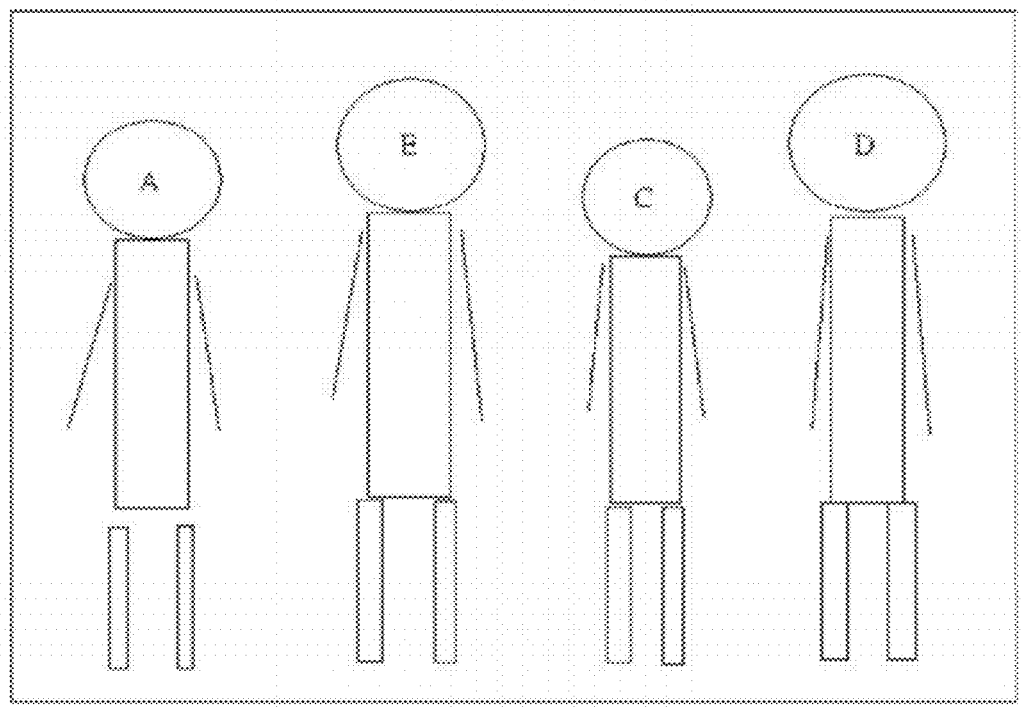
FIG. 3 shows another example of a photo.

In the example of the photo shown in FIG. 2, the distance between the person "A" and person "B" is 1, the distance between the person "A" and person "C" is 2, and the distance between the person "B" and person "C" is 1. In the example of the photo shown in FIG. 3, the distance between the person "A" and person "E" is 1, the distance between the person "A" and person "C" is 2, the distance between the person "A" and person "D" is 3, the distance between the person "E" and person "C" is 3, the distance between the person "E" and person "D" is 2, and the distance between the person "C" and person "D" is 1.

In addition, the interpersonal relationship analysis module 14 further analyzes a relationship E(n) between the person with the selected face and each of the other persons comprised in the selected photo using a function E(n)=1/f(t, d), and totals the relationship E(n) to obtain an interpersonal relationship of the person with the selected face. One example of the function is E(n)=1/t*d.

Figure 4:
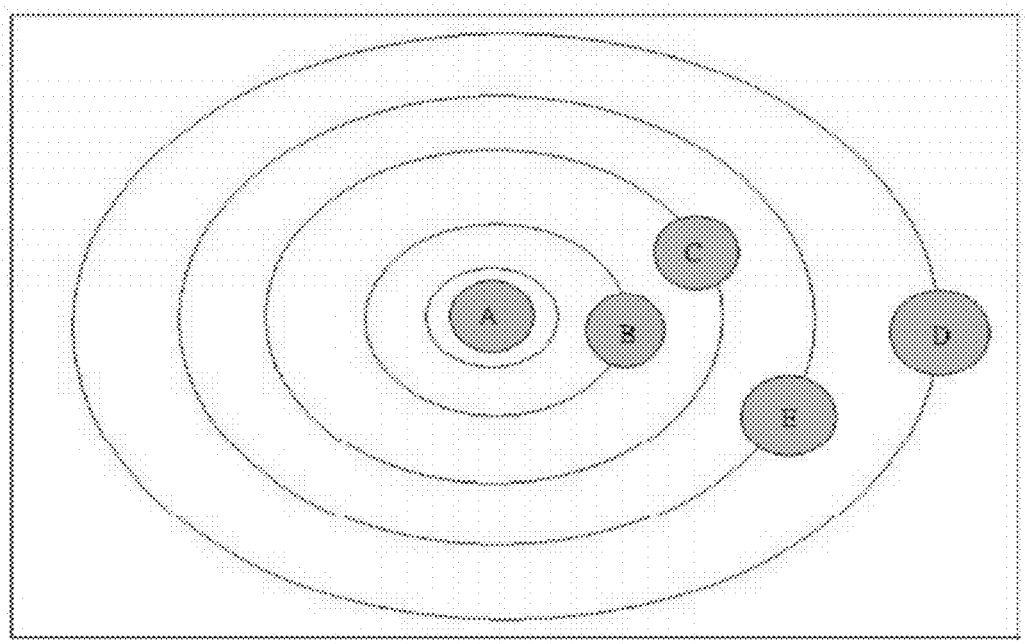
FIG. 4 shows an example of an interpersonal relationship of one person.

The interpersonal relationship show module 15 is operable to show the interpersonal relationship of the person with the selected face on a display 5, as shown in FIG. 4.

Figure 5:
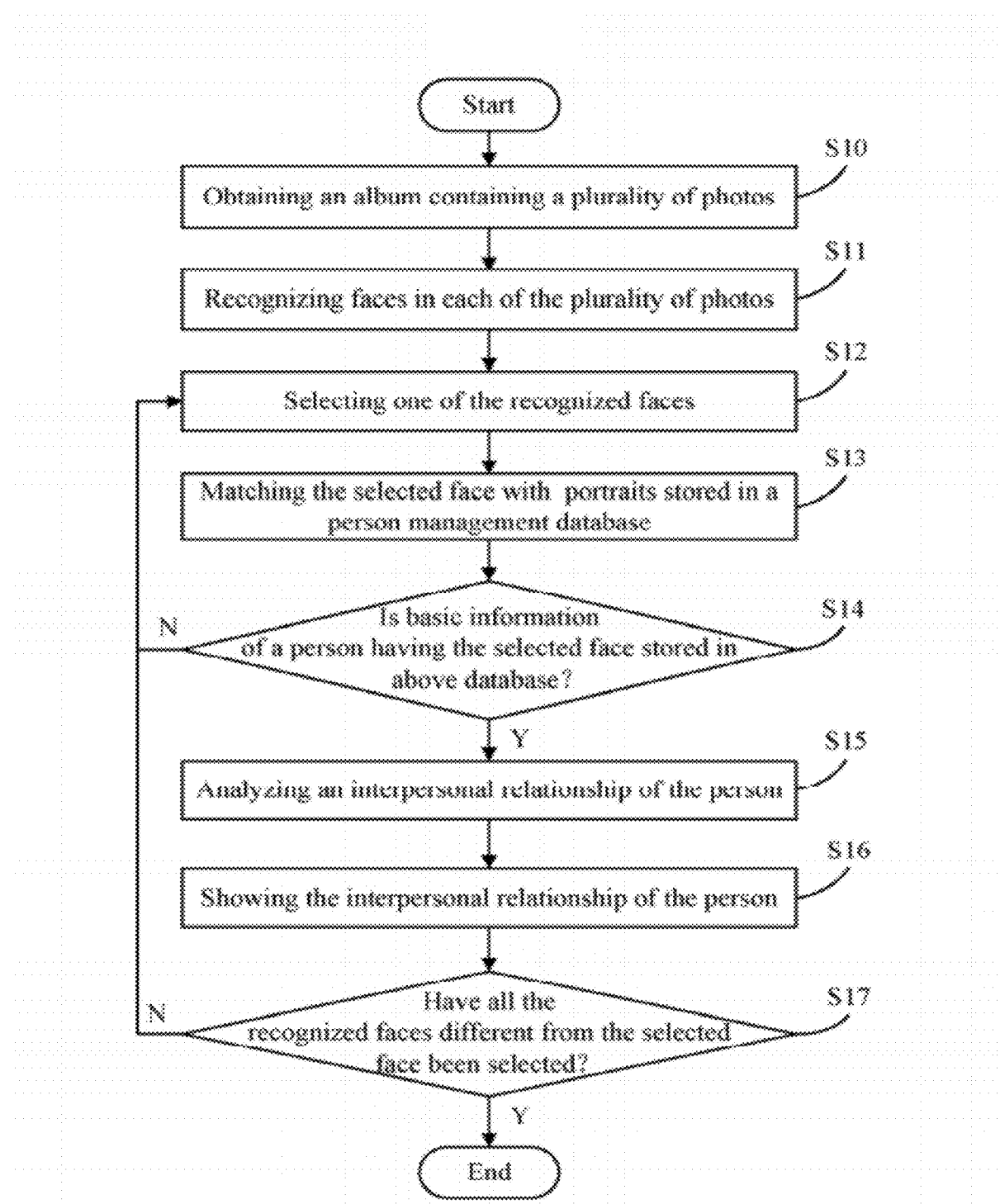
FIG. 5 is a flowchart illustrating one embodiment of an interpersonal relationships analysis method.

FIG. 5 is a flowchart illustrating one embodiment of an interpersonal relationships analysis method. Depending on the embodiment, in FIG. 5, additional blocks may be added, others removed, and the ordering of the blocks may be changed.

In block S10, the album management module 11 obtains an album comprising a plurality of photos from the remote database server 4 via the Internet 3 or from a local database server 2.

In block S11, the face recognition module 12 recognizes faces in each of the plurality of photos obtained above.

In block S12, the face match module 13 selects one of the recognized faces.

In block S13, the face match module 13 matches the selected face with the portraits stored in the person management database 10.

In block S14, the face match module 13 determines if basic information of a person with the selected face is stored in the person management database 10. If the basic information of the person with the selected face is not stored in the person management database 10, block S12 is repeated. Otherwise, if the basic information of the person with the selected face is stored in the person management database 10, block S15 is implemented.

Figure 6:
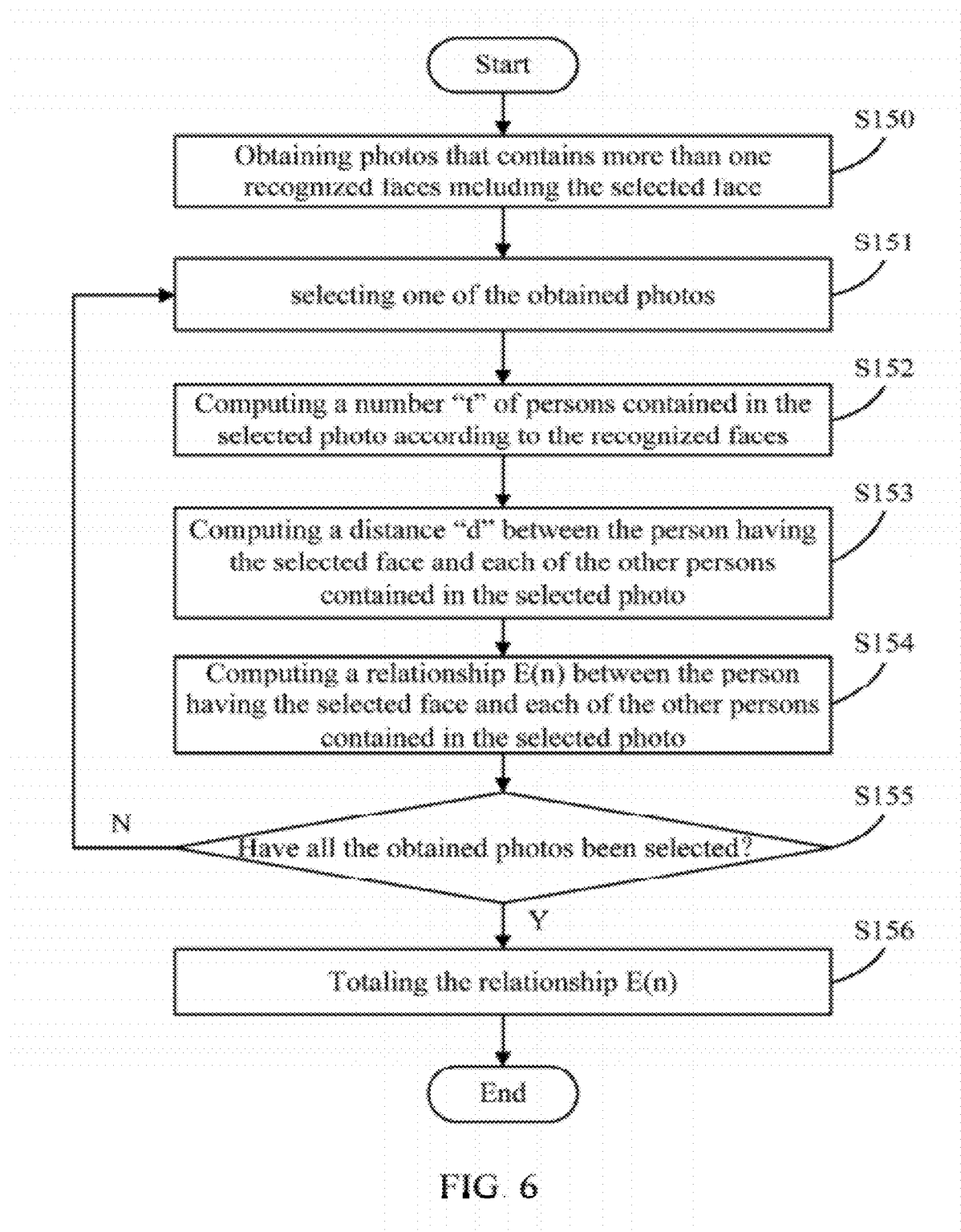
FIG. 6 details block S15 of FIG. 5.

In block S15, the interpersonal relationship analysis module 14 analyzes an interpersonal relationship of the person with the selected face according to the album, as illustrated in FIG. 6.

In block S16, the interpersonal relationship show module 15 shows the interpersonal relationship of the person with the selected face on the display 5, as shown in FIG. 4.

In block S17, the face match module 13 determines if any other recognized face different from the selected face has not been selected. If any one of such faces has not been selected, block S12 is repeated. Otherwise, if all such faces have been selected, the flow ends.

FIG. 6 details block S15 of FIG. 5. Depending on the embodiment, in FIG. 6, additional blocks may be added, others removed, and the ordering of the blocks may be changed.

In block S150, the interpersonal relationship analysis module 14 obtains photos that comprises more than one faces including the selected face from the album.

In block S151, the interpersonal relationship analysis module 14 selects one of the obtained photos.

In block S152, the interpersonal relationship analysis module 14 computes a number "t" of the persons comprised in the selected photo according to the recognized faces.

In block S153, the interpersonal relationship analysis module 14 further computes a distance "d" between the person with the selected face and each of the other persons comprised in the selected photo. In one embodiment, the distance is a relative value indicating how close two persons stood in the selected photo.

In block S154, the interpersonal relationship analysis module 14 computes a relationship E(n) between the person with the selected face and each of the other persons comprised in the selected photo using a function E(n)=1/f(t, d). One example of the function is E(n)=1/t*d, where, "*" is a multiplication sign.

In block S155 the interpersonal relationship analysis module 14 determines if all the obtained photos have been selected. If any one of the obtained photos has not been selected, block S151 is repeated. If all the obtained photos have been selected, block S156 is implemented.

In block S156, the interpersonal relationship analysis module 14 totals the relationship E(n) to obtain the interpersonal relationship of the person with the selected face.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An interpersonal relationships analysis method, the method being performed by execution of computer readable program code by at least one processor of at least one computer system, the interpersonal relationships analysis method comprising:
 (a) obtaining an album comprising a plurality of photos;
 (b) recognizing faces in each of the plurality of photos;
 (c) selecting one of the recognized faces;
 (d) matching the selected face with portraits stored in a person management database, determining if basic information of a person with the selected face is stored in the person management database;
 (e) analyzing an interpersonal relationship of the person with the selected face according to the album by computing a distance between the person with the selected face and each of the other persons which are in the same photo with the person with the selected face, upon condition that the basic information of the person with the selected face is stored in the person management database;
 (f) showing the interpersonal relationship of the person with the selected face on a display; and
 (g) repeating blocks (c) to (f) until all other recognized faces different from the selected face have been selected.

2. The interpersonal relationships analysis method as described in claim 1, wherein block (e) comprises:
 (e1) obtaining photos that comprise the selected face from the album;
 (e2) selecting one of the obtained photos;
 (e3) computing a number "t" of the persons comprised in the selected photo according to the recognized faces;
 (e4) computing a distance "d" between the person with the selected face and each of the other persons comprised in the selected photo when the number "t" is greater than 2;
 (e5) computing a relationship E(n) between the person with the selected face and each of the other persons comprised in the selected photo according to "t" and "d";
 (e6) repeating blocks (e2) to (e5) until all the obtained photos have been selected; and
 (e7) totaling the relationship E(n) to obtain the interpersonal relationship of the person with the selected face.

3. The interpersonal relationships analysis method as described in claim 1, wherein E(n)=1/f(t, d).

4. The interpersonal relationships analysis method as described in claim 1, wherein E(n)=1/t*d.

5. The interpersonal relationships analysis method as described in claim 1, wherein the basic information comprises name information, address information, and phone number information.

6. A non-transitory computer-readable medium with stored thereon instructions that, when executed by an electronic device, cause the electronic device to perform an relationships analysis method, wherein the interpersonal relationships analysis method comprises:
(a) obtaining an album comprising a plurality of photos;
(b) recognizing faces in each of the plurality of photos;
(c) selecting one of the recognized faces;
(d) matching the selected face with portraits stored in a person management database, determining if basic information of a person with the selected face is stored in the person management database;
(e) analyzing an interpersonal relationship of the person with the selected face according to the album by computing a distance between the person with the selected face and each of the other persons which are in the same photo with the person with the selected face, upon condition that the basic information of the person with the selected face is stored in the person management database;
(f) showing the interpersonal relationship of the person with the selected face; and
(g) repeating blocks (c) to (f) until all other recognized faces different from the selected face is selected.

7. The non-transitory computer-readable medium as described in claim 6, wherein block (e) comprises:
(e1) obtaining photos that comprise the selected face from the album;
(e2) selecting one of the obtained photos;
(e3) computing a number "t" of the persons comprised in the selected photo according to the recognized faces;
(e4) computing a distance "d" between the person with the selected face and each of the other persons comprised in the selected photo when the number "t" is greater than 2;
(e5) computing a relationship E(n) between the person with the selected face and each of the other persons comprised in the selected photo according to "t" and "d";
(e6) repeating blocks (e2) to (e5) until all the obtained photos have been selected; and
(e7) totaling the relationship E(n) to obtain the interpersonal relationship of the person with the selected face.

8. The non-transitory computer-readable medium as described in claim 6, wherein $E(n)=1/f(t, d)$.

9. The non-transitory computer-readable medium as described in claim 6, wherein $E(n)=1/t*d$.

10. The non-transitory computer-readable medium as described in claim 6, wherein the basic information comprises name information, address information, and phone number information.

11. An interpersonal relationships analysis system, comprising:
a person management data that stores a portrait and basic information of each given person;
an album management module operable to obtain an album comprising a plurality of photos;
a face recognition module operable to recognize faces in each of the plurality of photos;
a face match module operable to select one of the recognized faces one by one, match the selected face with the portraits stored in the person management database, determine if the basic information of a person with the selected face is stored in the person management database;
an interpersonal relationship analysis module operable to analyze an interpersonal relationship of the person with the selected face according to the album by computing a distance between the person with the selected face and each of the other persons which are in the same photo with the person with the selected face, upon condition that the basic information of the person with the selected face is stored in the person management database;
an interpersonal relationship show module operable to show the interpersonal relationship of the person with the selected face on a display; and
a processor that executes the album management module, the face recognition module, the face match module, the interpersonal relationship analysis module, and the interpersonal relationship show module.

12. The interpersonal relationships analysis system as described in claim 11, wherein the interpersonal relationship analysis module analyzes the interpersonal relationship of the person with the selected face by:
(e1) obtaining photos that comprise the selected face from the album;
(e2) selecting one of the obtained photos;
(e3) computing a number "t" of the persons comprised in the selected photo according to the recognized faces;
(e4) computing a distance "d" between the person with the selected face and each of the other persons comprised in the selected photo when the number "t" is greater than 2;
(e5) computing a relationship E(n) between the person with the selected face and each of the other persons comprised in the selected photo according to "t" and "d";
(e6) repeating blocks (e2) to (e5) until all the obtained photos have been selected; and
(e7) totaling the relationship E(n) to obtain the interpersonal relationship of the person with the selected face.

13. The interpersonal relationships analysis system as described in claim 11, wherein $E(n)=1/f(t, d)$.

14. The interpersonal relationships analysis system as described in claim 13, wherein $E(n)=1/t*d$.

15. The interpersonal relationships analysis system as described in claim 11, wherein the basic information comprise name information, address information, and phone number information.

* * * * *